(12) United States Patent  (10) Patent No.: US 9,332,170 B1
Khalili  (45) Date of Patent: May 3, 2016

(54) TELESCOPING EXTENSION

(71) Applicant: Ali Khalili, Abu Dhabi (AE)

(72) Inventor: Ali Khalili, Abu Dhabi (AE)

( * ) Notice: Subject to any disclaimer, the term of this patent is extended or adjusted under 35 U.S.C. 154(b) by 33 days.

(21) Appl. No.: 14/309,818

(22) Filed: Jun. 19, 2014

(51) Int. Cl.
*H04N 5/232* (2006.01)
*H04N 5/225* (2006.01)

(52) U.S. Cl.
CPC ......... *H04N 5/23203* (2013.01); *H04N 5/2251* (2013.01); *H04N 5/2252* (2013.01)

(58) Field of Classification Search
CPC ... H04N 5/2251; H04N 5/2252; H04N 5/232; H04N 5/23203
See application file for complete search history.

(56) References Cited

U.S. PATENT DOCUMENTS

| | | | |
|---|---|---|---|
| 7,706,673 B1* | 4/2010 | Staudinger | F16M 11/06 348/211.2 |
| 2006/0257138 A1 | 11/2006 | Fromm | |
| 2006/0269276 A1 | 11/2006 | O'Shea et al. | |
| 2007/0053680 A1* | 3/2007 | Fromm | F16M 11/14 396/420 |
| 2008/0187308 A1 | 8/2008 | Hannan | |
| 2010/0072334 A1 | 3/2010 | Le Gette et al. | |
| 2010/0200710 A1 | 8/2010 | Shenouda | |
| 2013/0161967 A1 | 6/2013 | Jarrett et al. | |
| 2013/0233986 A1* | 9/2013 | Rasheta | G03B 17/561 248/205.1 |
| 2014/0003802 A1* | 1/2014 | Fromm | G03B 17/561 396/428 |
| 2014/0097306 A1* | 4/2014 | Hale | F16M 13/022 248/122.1 |
| 2014/0313358 A1* | 10/2014 | Yu | H04N 5/23203 348/211.7 |
| 2015/0159801 A1* | 6/2015 | Oda | F16M 11/046 248/124.1 |

FOREIGN PATENT DOCUMENTS

WO    WO 2014002395 A1 *    1/2014    ......... F16M 11/046

\* cited by examiner

*Primary Examiner* — Roberto Velez
*Assistant Examiner* — Abdelaaziz Tissire
(74) *Attorney, Agent, or Firm* — QuickPatents, LLC; Kevin Prince

(57) ABSTRACT

A telescoping extension for a portable electronic device of the type having a camera and a wireless communication circuit comprises a telescoping arm that has a handle at a proximal end thereof and an attachment head at a distal end thereof. The attachment head telescopingly extends away from the handle with a telescoping mechanism. A device support has an attachment mechanism for slidably and pivotally fixing with the attachment head of the telescoping arm. The device support is adapted for fixing with the portable electronic device. A remote control is selectively and detachably fixed with the telescoping arm is adapted for wireless communication with the wireless communication circuit of the portable electronic device. The remote control includes a switch for communicating a command to the portable electronic device, such as a command to take a photograph, or to start or stop a video recording.

13 Claims, 4 Drawing Sheets

TELESCOPING EXTENSION

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to portable electronic device accessories, and more particularly to an extension arm for mounting a portable electronic device.

DISCUSSION OF RELATED ART

Taking photographs and videos of oneself with a portable electronic device such as a cell phones, PDA, tablet computer, or the like is gaining popularity. It is usually the case that the user of such a device when taking such a photograph would prefer that the photograph not include the user's arm off to the side of the shot, which makes it obvious that the photograph was being taken by the subject of the photograph. Further, often a person's reach isn't sufficient to properly frame the subject along with the background as desired.

A few camera mounts are available in the prior art for extending a camera away from a handle, typically using a telescoping mechanism. For example, US Patent Application 2010/0200710 to Shenouda on Aug. 12, 2010; US Patent Application 2006/0257138 to Fromm on Nov. 16, 2006; US Patent Application 2008/0187308 to Hannan on Aug. 7, 2008; and US Patent Application 2013/0233986 to Rasheta on Sep. 12, 2013 all teach such a device. However, such devices are not designed to be carried with the portable electronic device, but rather are separate devices design to be attached only when used. As such, often such devices are out of reach or stored when the need arises to use such a device, which with many users is spontaneous and unplanned.

Further, such devices do not easily allow for the portable electronic device to be supported on a flat surface in either portrait or landscape orientation if such a support surface is available. One prior art phone case, taught in US Patent Application 2010/0072334 to Le Gette et al. on Mar. 25, 2010, includes a collapsible leg for supporting a smart phone in a landscape orientation on a flat surface. However, such a device provides for no telescopically-extendable mount or for use in a portrait orientation on a flat surface.

Therefore, there is a need for a telescopic extension mount for a portable electronic device that not only allows for the extension of the device away from the user for taking so-called "selfie" photos and videos from a distance greater than arm's length, but that also is able to assume a compact configuration that is easily stored with the device while being carried. Such a needed device would allow the portable electronic device to be angularly adjusted to avoid capturing any part of the device in a photo or video. Such a needed invention would allow for supporting the portable electronic device on a flat surface in either portrait or landscape orientation, and would be relatively simple to manufacture and use. Such a needed invention would easily be mounted to a portable electronic device directly, or to an outer case for the device. The present invention accomplishes these objectives.

SUMMARY OF THE INVENTION

The present device is a telescoping extension for a portable electronic device, such as a cellular phone or a so-called "smart phone." Such a portable electronic device is of the type having a camera and a wireless communication circuit, such as a Bluetooth or WiFi-type wireless communication circuit, for example.

The telescoping extension comprises a telescoping arm that has a handle at a proximal end thereof and an attachment head at a distal end thereof. The attachment head telescopingly extends away from the handle with a telescoping mechanism when the attachment head and the handle are pulled mutually apart.

A device support has an attachment mechanism for slidably fixing with the attachment head of the telescoping arm. The attachment mechanism includes a pivot mechanism for allowing the device support to pivot about the attachment head. The device support is adapted for fixing with the portable electronic device and is preferably a relatively flat sheet of rigid material.

A remote control enclosure is selectively and detachably fixed with the telescoping arm and includes a remote control circuit adapted for wireless communication with the wireless communication circuit of the portable electronic device. The remote control circuit includes at least a first electronic switch for communicating a command to the portable electronic device, such as a command to take a photograph, or to start or stop a video recording, for example.

In use, with the portable electronic device fixed with the device support, and with the telescoping arm extended from a retracted position to an extended position, and with the device support rotated so as to properly orient the portable electronic device into a desired direction, the switch or a second switch of the remote control circuit may be closed to instruct the portable electronic device to perform an action. The remote control enclosure may be removed from the telescoping extension during use if desired.

In one embodiment, the telescoping extension further includes a leg pivotally fixed at a pivot with the telescoping arm and selectively movable between a retracted position and an extended position. As such, the leg when placed in the extended position allows the telescoping extension to be stably supported on a flat support surface in either a landscape orientation or a portrait orientation.

The present invention is a telescopic extension mount for a portable electronic device that not only allows for the extension of the device away from the user for taking so-called "selfie" photos and videos from a distance greater than arm's length, but that also is able to assume a compact configuration that is easily stored with the device while being carried. The present device further allows the portable electronic device to be angularly adjusted to avoid capturing any part of the device in a photo or video. The present invention allows for supporting the portable electronic device on a flat surface in either portrait or landscape orientation, and is relatively simple to manufacture and use. The present device provides for mounted to a portable electronic device directly, or to an outer case for the device. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
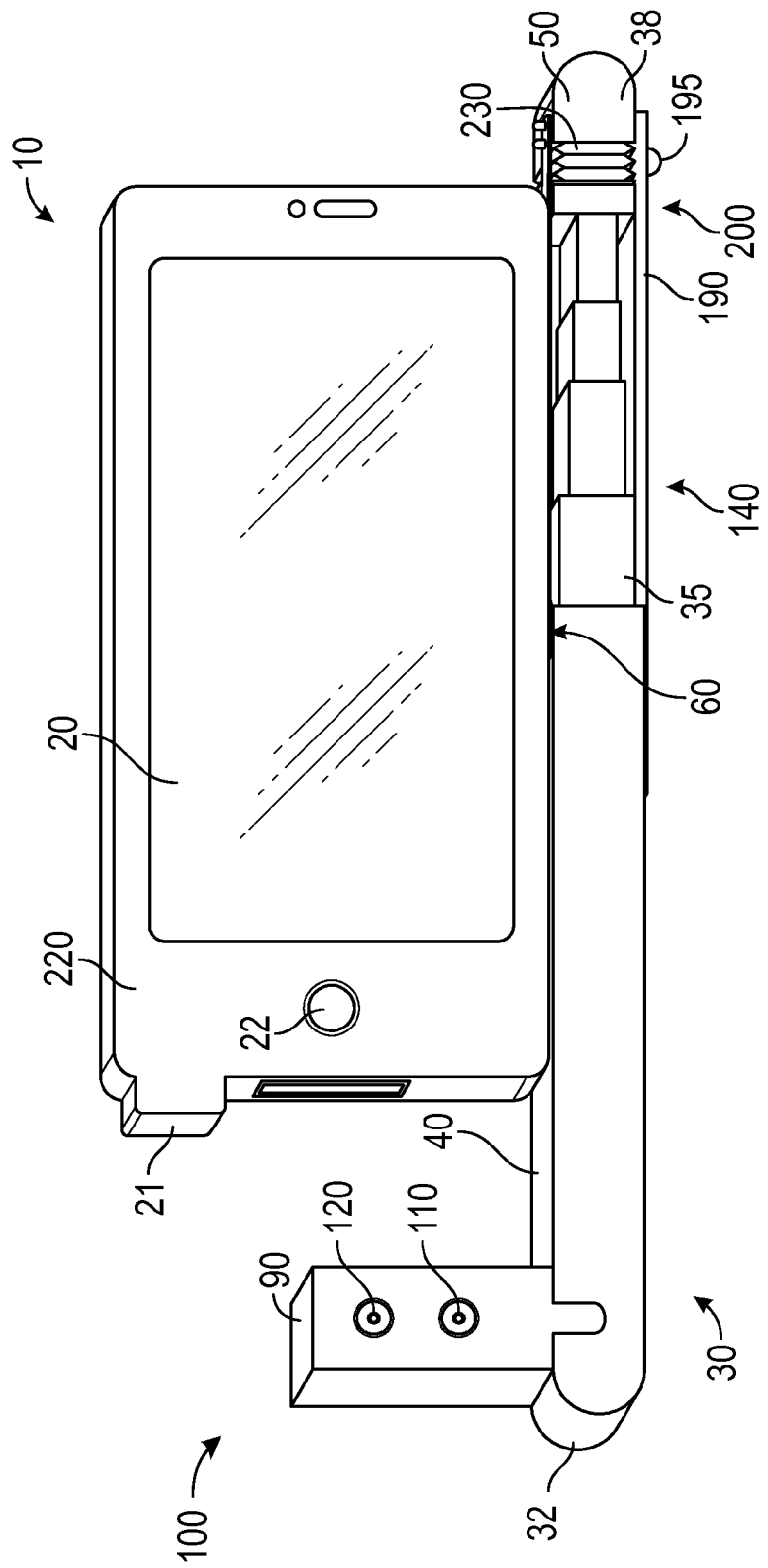
FIG. 1 is a perspective view of the invention, illustrated with a telescoping arm in a partially extended position.
Figure 2:
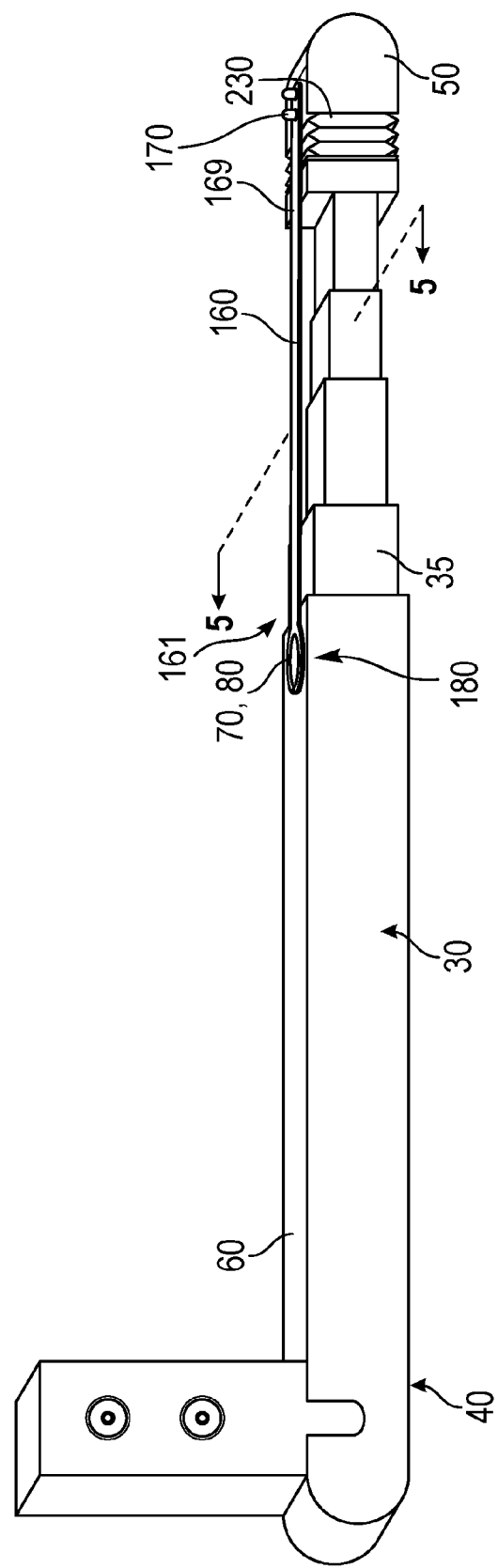
FIG. 2 is a perspective view of FIG. 1, illustrated with a portable electronic device omitted for clarity of illustration.

FIGS. 1 and 2 illustrate a telescoping extension 10 for a portable electronic device 20, such as a cellular phone or a so-called "smart phone." Such a portable electronic device 20 is of the type having a camera 22 and a wireless communication circuit 21, such as a Bluetooth or WiFi-type wireless communication circuit, for example.

Figure 5:
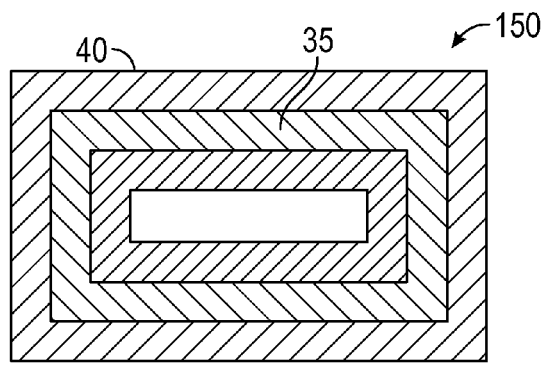
FIG. 5 is a cross-sectional view of a telescoping mechanism of the invention, illustrating a non-circular shape of the telescoping mechanism.
Figure 6:
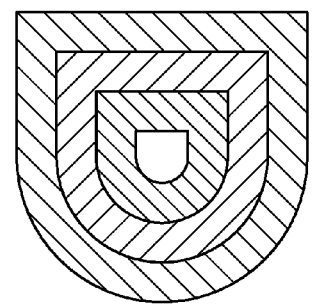
FIG. 6 is a cross-sectional view of the telescoping mechanism of the invention, illustrating an alternate non-circular shape of the telescoping mechanism.

The telescoping extension 10 comprises a telescoping arm 30 that has a handle 40 at a proximal end 32 thereof and an attachment head 50 at a distal end 38 thereof. The attachment head 50 telescopingly extends away from the handle 40 with a telescoping mechanism 35 when the attachment head 50 and the handle 40 are pulled mutually apart. Preferably the telescoping mechanism 35 is a plurality of rigid, nested segments that have a cross-sectional shape 150 that are each non-circular, such as rectangular (FIG. 5) or partially-circular (FIG. 6). The handle 40 and attachment head 50 are each preferably made from a rigid material such as carbon fiber, hard plastic or metal.

A device support 60 has an attachment mechanism 70 for slidably fixing with the attachment head 50 of the telescoping arm 30. The attachment mechanism 70 includes a pivot mechanism 80 for allowing the device support 60 to pivot about the attachment head 50. The device support 60 is adapted for fixing with the portable electronic device 20 and is preferably a relatively flat sheet of rigid material, such as metal, carbon fiber material, or strong plastic.

Preferably the attachment mechanism 70 of the device support 60 is at least one groove 160 in the device support 60 that is slidably cooperative with at least one prong 170 of the attachment head 50. As such, the device support 60 is slidably attached to the attachment head 50 from one side 161 of the at least one groove 160 to an opposing side 169 of the at least one groove 160. In one embodiment the support device 20 is angled between 5 and 35-degrees with respect to the handle 40, such that the camera 22 of the portable electronic device 20 can be set to not capture the telescoping arm 30 in its field-of-view. In one embodiment a case 220 is fixed with the device support 60 and is adapted for selectively holding the portable electronic device 20, such as by friction fit.

In one preferred embodiment, the at least one groove 160 is at least two grooves 160, and the at least one prong 170 is at least two prongs 170. In such an embodiment, the pivot mechanism further includes a circle pattern 180 of the at least two grooves 160, such that when the at least two grooves 160 of the attachment head 50 are aligned with the circle pattern 180 the device support 60 is free to rotate with respect to the telescoping arm 30.

A remote control enclosure 90 is selectively and detachably fixed with the telescoping arm 30 and includes a remote control circuit 100 adapted for wireless communication with the wireless communication circuit 21 of the portable electronic device 20. The remote control circuit 100 includes at least a first electronic switch 110 for communicating a command to the portable electronic device 20, such as a command to take a photograph, or to start or stop a video recording, for example. In one embodiment, a second electronic switch 120 is included in the remote control circuit 100, the first electronic switch 110 for communicating the command to take a photograph, and the second electronic switch 120 for communicating the command to either start or stop a video recording, for example.

Figure 3:
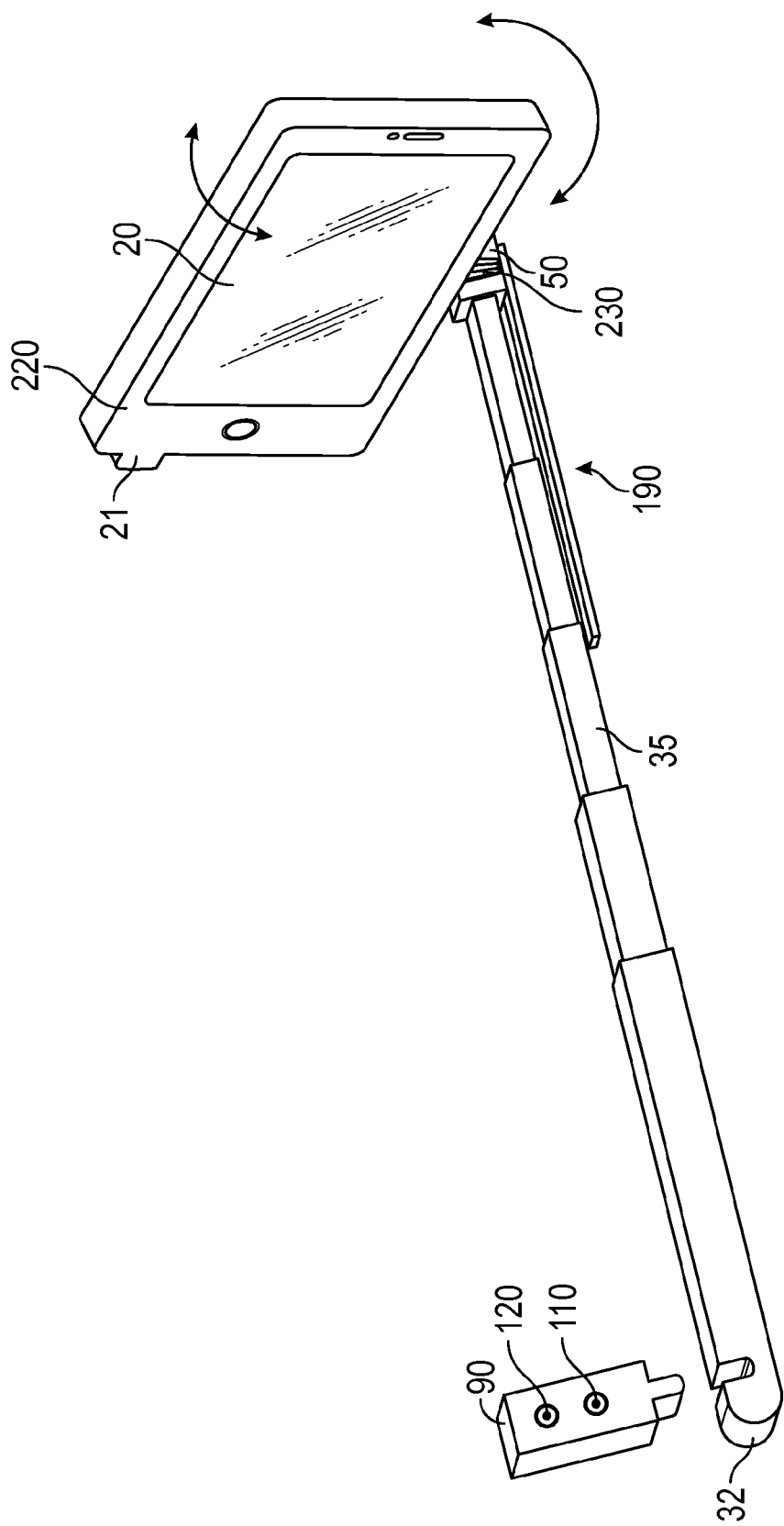
FIG. 3 is a perspective view of the invention, illustrated with the telescoping arm in a fully extended position and angled downwardly with the portable electronic device rotated back towards the telescoping arm.

In use, with the portable electronic device 20 fixed with the device support 60, and with the telescoping arm 30 extended from a retracted position 130 (FIG. 4) to an extended position 140 (FIG. 3), and with the device support 60 rotated so as to properly orient the portable electronic device into a desired direction, the switch 110 or the second switch 120 of the remote control circuit 100 may be closed to instruct the portable electronic device 20 to perform an action. The remote control enclosure 90 may be removed from the telescoping extension 10 during use if desired.

Figure 4:
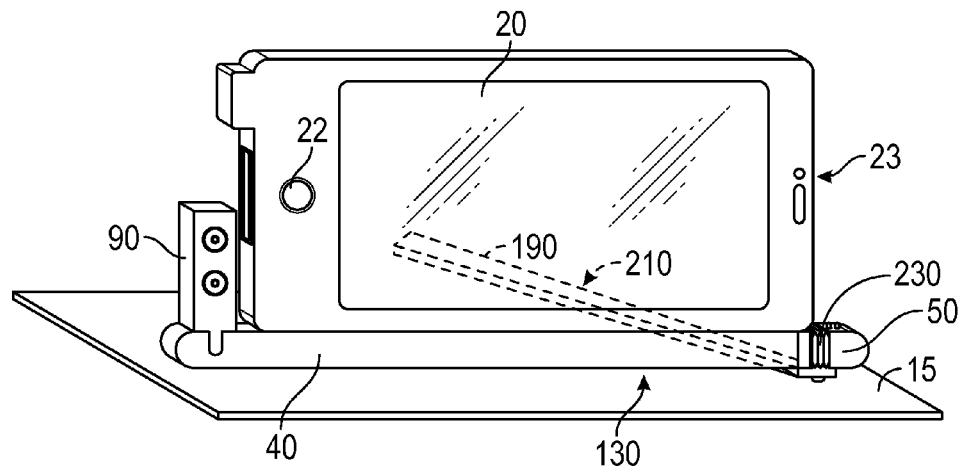
FIG. 4 is a perspective view of the invention, illustrated with a leg in an extended position for supporting the portable electronic device on a support surface in a landscape orientation.
Figure 7:
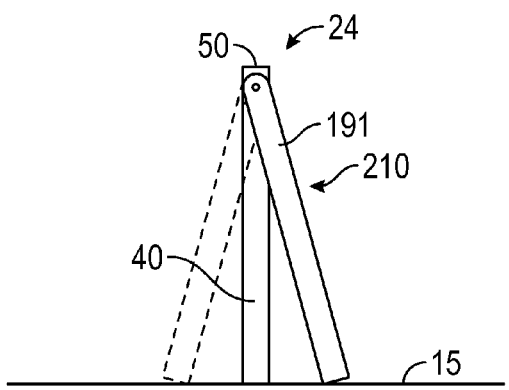
FIG. 7 is a side elevational view showing the leg in the extended position to support the portable electronic device in a portrait orientation.

In one embodiment, the telescoping extension 10 further includes a leg 190 pivotally fixed at a pivot 195 with the telescoping arm 30 and selectively movable between a retracted position 200 and an extended position 210 (FIGS. 4 and 7). As such, the leg 190 when placed in the extended position 210 allows the telescoping extension 10 to be stably supported on a flat support surface 15 in either a landscape orientation 23 or a portrait orientation 24.

In one embodiment, the telescoping arm 30 further includes a tilting joint 230 (FIGS. 1-4) fixed between the telescoping mechanism 35 and the attachment head 50, such that the telescoping arm 30 may be tilted down with respect to the attachment head 50 so that the telescoping arm 30 is not captured in any photo or video captured by the portable electronic device 20.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A telescoping extension for a portable electronic device of the type having a camera and a wireless communication circuit, the telescoping extension comprising:
   a telescoping arm have a handle at a proximal end thereof and an attachment head at a distal end thereof, the attachment head telescopingly extendable away from the handle with a telescoping mechanism;
   a device support having an attachment mechanism for slidably fixing with the attachment head of the telescoping arm, the attachment mechanism including a pivot mechanism for allowing the device support to pivot about the attachment head, the device support adapted for fixing with the portable electronic device, the attachment mechanism of the device support being at least two grooves slidably cooperative with at least two prongs of the attachment head, the pivot mechanism further including a circle pattern of the at least two grooves, the device support being slidably attached to the attachment head from one side of the grooves to an opposing side of the grooves;
   a remote control circuit adapted for wireless communication with the wireless communication circuit of the portable electronic device and including at least a first electronic switch for communicating a command to the portable electronic device, the remote control circuit fixed with the handle;
   whereby with the portable electronic device fixed with the device support, and with the telescoping arm extended from a retracted position to an extended position, and with the device support rotated so as to properly orient the portable electronic device towards the handle, the switch of the remote control circuit can be closed to instruct the portable electronic device to perform an action, and whereby with the at least two grooves of the attachment head aligned with the circle pattern, the device support is free to rotate with respect to the telescoping arm.

2. The telescoping extension of claim 1 wherein the remote control circuit is at least partially contained in a remote control enclosure that is selectively and detachably fixed with the handle of the telescoping arm.

3. The telescoping extension of claim 1 wherein the cross-sectional shape of the telescoping mechanism is non-circular.

4. The telescoping extension of claim 1 wherein the first electronic switch communicates a command to the portable electronic device to take a photograph with the camera thereof.

5. The telescoping extension of claim 1 wherein the first electronic switch communicates a command to the portable electronic device to capture a video with the camera thereof.

6. The telescoping extension of claim 1 wherein the remote control circuit further includes a second electronic switch, the first electronic switch when closed communicating a command to the portable electronic device to take a photograph with the camera thereof, the second electronic switch when closed communicating a command to the portable electronic device to capture a video with the camera thereof.

7. The telescoping extension of claim 1 further including a leg pivotally fixed with the telescoping arm and selectively movable between a retracted and an extended position, whereby with the leg placed in the extended position the telescoping extension is able to stably support the portable electronic device on a flat surface in a landscape orientation.

8. The telescoping extension of claim 1 further including a leg pivotally fixed with the telescoping arm and selectively movable between a retracted and an extended position, whereby with the leg placed in the extended position the telescoping extension is able to stably support the portable electronic device on a flat surface in a portrait orientation.

9. The telescoping extension of claim 1 further including a case fixed with the device support, the case adapted for selectively holding the portable electronic device.

10. The telescoping extension of claim 1 wherein the support device is angled with respect to the handle such that the camera of the portable electronic device cannot capture the telescoping arm.

11. The telescoping extension of claim 1 wherein the remote control circuit is adapted for wireless communication with the wireless communication circuit of the portable electronic device using a Bluetooth wireless protocol.

12. The telescoping extension of claim 1 wherein the remote control circuit is adapted for wireless communication with the wireless communication circuit of the portable electronic device using a WiFi wireless protocol.

13. The telescoping extension of claim 1 wherein the telescoping arm further includes a tilting joint fixed between the telescoping mechanism and the attachment head, whereby the telescoping arm can be tilted down with respect to the attachment head so that the telescoping arm is not captured in any photo or video captured by the portable electronic device.

\* \* \* \* \*